UNITED STATES PATENT OFFICE.

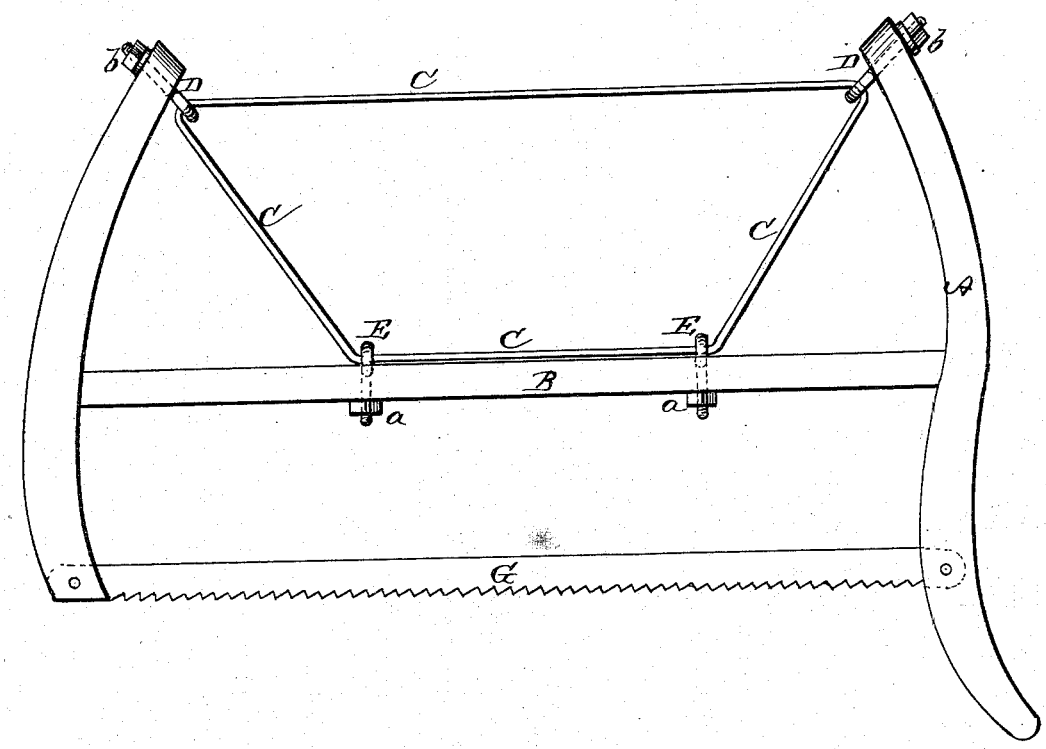

CHARLES A. HURLBURT, OF YPSILANTI, MICHIGAN.

IMPROVEMENT IN BUCK-SAW FRAMES.

Specification forming part of Letters Patent No. 165,099, dated June 29, 1875; application filed May 6, 1875.

*To all whom it may concern:*

Be it known that I, CHAS. A. HURLBURT, of Ypsilanti, in the county of Washtenaw and State of Michigan, have invented certain new and useful Improvements in Buck-Saw Frames; and I do hereby declare that the following is a full, clear, and exact description thereof, reference being had to the accompanying drawings and to the letters of reference marked thereon, which form part of this specification.

The nature of my invention consists in the construction and arrangement of a device for bracing the frame and straining the blade of a wood-saw, as will be hereinafter more fully set forth.

In order to enable others skilled in the art to which my invention appertains to make and use the same, I will now proceed to describe its construction and operation, referring to the annexed drawing, which represents a side view of a wood-saw embodying my invention.

A A represent the end bars, and B the cross-bar, of a saw-frame. G is the saw-blade. C represents a continuous rod, or iron, or wire, of suitable strength and thickness, bent to the proper shape, and its ends welded together. Before welding the bolts D D and E E are slipped on the rod. The bolts E E are passed through the cross-bar B, and fastened on the under side thereof by nuts *a a*. The eyebolts D D are passed through the upper ends of the side bars A A, and fastened by nuts *b b*. The tightening of the nuts or thumb-screws at *b b* strains the blade G by drawing the side pieces against the ends of the cross-bar B, thus accomplishing the straining of the blade. The rod C, forming shoulders at the eyes of the bolts E E, braces the frame from said eyebolts to the eyebolts D D, thus making the frame stronger and more durable.

To prevent any play of the frame, the eyebolts are made to clasp the rod tight when completed. The upper part of the rod C may be separated and united by a swivel and screw, if desired, but I prefer to make it with the ends welded together.

Having thus fully described my invention, what I claim as new, and desire to secure by Letters Patent, is—

In a saw-frame, the combination of the continuous rod C, with the eyebolts E E and D D, and bars A A, and cross-bar B, constructed and arranged to operate as shown and described, and for the purposes specified.

In testimony that I claim the foregoing as my own I affix my signature in presence of two witnesses.

CHARLES A. HURLBURT.

Witnesses:
 HENRY W. MILLER,
 WM. R. HINDS.